3,262,877
WATER TREATMENT PROCESS
Archie R. Le Compte, Jr., Neenah, Wis., assignor to Kimberly-Clark Corporation, Neenah, Wis., a corporation of Delaware
Filed Nov. 5, 1964, Ser. No. 409,102
10 Claims. (Cl. 210—47)

This application is a continuation-in-part of my application Serial No. 326,997 filed Nov. 29, 1963, assigned to the same assignee as the present invention and now abandoned.

This invention relates to water clarification and reclamation and is particularly directed to water system operation on a recirculation basis with makeup water addition only to the extent that such is necessary to provide for incidental losses which characterize the particular water usage. The method provides for a recirculation of 70% and more of the process water of industrial systems.

Commonly, in the treatment of water for industrial uses, a lime treatment is employed to remove calcium and magnesium bicarbonate hardness. In the case of some paper mill effluent, finely divided solids include anionic material which may be in the form of fibrous particles. To remove suspended solids materials from the water, coagulants such as aluminum sulfate, iron chloride and the like are normally employed with lime in conjunction with sedimentation and/or filtration procedures. The coagulants, and frequently a coagulant aid, assist the building of a floc to a proper size for settling; sedimentation units permit the separation of the relatively slow settling floc thus formed from the purified water.

In my reference application I have described a method for the lime treatment of water in which finely divided magnesium oxide is employed in a preliminary water treatment reaction zone as a reactant material for the indirect attainment of a magnesium hydroxide floc. The magnesium oxide is first reacted with bicarbonate-containing waters to produce essentially magnesium carbonate in solution and the resultant magnesium carbonate is reacted with lime to produce the magnesium hydroxide floc. By bicarbonate-containing I refer to the bicarbonate radicals which may be in the form of magnesium bicarbonate, calcium bicarbonate or carbonic acid. Such is termed herein bicarbonate hardness.

I have now found that if the magnesium oxide is carefully prepared and handled prior to the introduction of the oxide to bicarbonate-containing waters, the efficiency of the procedure as a whole is materially improved. Broadly, I have found that the average particle size of the magnesium oxide reactant should be as fine as possible, and that premature reaction of the finely divided magnesium oxide with water to form the hydroxide should be avoided. While reaction to the hydroxide form prior to introduction to the water to be treated does not affect the operation of the system as to clarification and reclamation, it does require more magnesium oxide for the same coagulation effect or, alternately, lime, and, importantly, hydroxide formation slows the preliminary reaction because the surface area of the magnesium component is reduced by about 4 or 5 to 1.

For my purpose the magnesium oxide should be unhydrated and so finely divided when presented to the water that reaction with the bicarbonate hardness of the water is direct and essentially complete as to the magnesium oxide. By direct reaction I mean that there is no significant reduction in reactive surface of the magnesium component before solution of the magnesium component. This reaction not only provides the magnesium component in solution but also reduces the bicarbonate hardness of the water. The subsequent addition of lime then precipitates the magnesium component as a flocculent. This provides coagulation and reduces the lime requirement for softening of the water.

I have also found that a method employing a primary softening treatment followed by solids contact stabilization, with intermediate carbonation or a carbonation in the same equipment with the stabilization, affords an excellent system for water reclamation purposes. Such a method as broadly described affords a plurality of advantages. Particularly pertinent to industrial usages of the reclaimed water is that the procedure may be effected without the addition of comparatively refractory soluble salts to the system and, accordingly, there is no net increase in the dissolved solids of the water due to the water clarification treatment despite constant treatment and recirculation; in some instances, a decrease of dissolved solids may be achieved by removal in the primary softening step. Where the raw water does contain undesired soluble salts, bleed-off may be employed to inhibit the buildup of such components of the water.

The finely divided magnesium oxide is initially reacted with calcium bicarbonate hardness in the water up to a pH approximating 10.2 to produce magnesium carbonate and calcium carbonate with some minor amount of magnesium bicarbonate normally resulting also. By effecting the reaction in the presence of makeup water or water to be reclaimed, there is an initial softening of the water due to calcium carbonate formation. Thus, the reaction serves the dual purpose of softening and of providing the necessary soluble magnesium carbonate and/or bicarbonate for the primary softening treatment. Additionally, this reaction conserves lime by virtue of the direct formation of the magnesium carbonate and calcium carbonate as principal reaction products. Importantly, also, the calcium carbonate constituent formed may be carried with the water to the primary softening treatment to add weight to the sludge produced in this latter step, thus aiding settling. In many reclamation procedures wherein the magnesium hydroxide floc demand and the alkalinity of the recycled and/or makeup waters are in balance, the initial magnesium oxide reaction with the bicarbonates may be substantially stoichiometric; in this instance optimum lime saving is achieved and optimum calcium carbonate formation occurs.

Important to the system operation is the addition, in the primary softening step, of the soluble magnesium salts and a relatively high pH occasioned by lime employed in this softening stage. Magnesium hydroxide is formed in situ by lime addition and effects a plurality of functions. First, it is a flocculent precipitate, essentially gelatinous and quite voluminous so that it readily encompasses even finely divided solids including calcium bearing compounds and substances in fiber form; some soluble organics also are adsorbed by this gelatinous floc. Because of these floc characteristics I have found a coagulant aid to be sometimes desirable to effect coagulation into a dense relatively rapid settling sludge mass. Secondly, the formed magnesium hydroxide is effective to neutralize anionically charged particles, such as the fiber particles which, for example, a papermaking system effluent frequently contains; additionally, the positively charged magnesium hydroxide floc reduces the negative charge of calcium carbonate particles and of those coagulant aids which are normally negatively charged in aqueous solution. The addition of the magnesium salt for this latter purpose and the optional addition of coagulant aids is preferably effected to an extent that the zeta potential of the system in the primary softener is between about zero and ±5 millivolts; in this range flocculation of the particles readily occurs. Thirdly, bacteria control is simultaneously achieved because of the high pH in the primary softener, preferably about 10.5 to about 11.2, a condition under which many bacteria are destroyed. Fourthly, pollution control is also achieved since water normally discarded is reclaimable. The sludge occasioned by the magnesium hydroxide floc is readily separated from the water effluent, as by sedimentation.

The water effluent of the primary treatment contains substantially only dissolved calcium carbonate, magnesium hydroxide, calcium hydroxide, and soluble salts which may have been originally present in the process water. Such effluent has the high pH range noted, about 10.5 to 11.2. This effluent is treated before or during stabilization to reduce the pH and to convert the magnesium and calcium hydroxides, at least in part, to magnesium carbonate and calcium carbonate.

Commonly, stabilization, that is, the removal of calcium carbonate supersaturation, would take place in the primary softener; however, I have found that with this present specifically described water reclamation system usually only partial stabilization may be achieved in the primary softener and subsequent stabilization is essential. This stabilization, I have found, is particularly influenced by the presence of phosphate ions in the water undergoing treatment. Such ions inhibit the controlled crystallization of the calcium carbonate resulting in a supersaturated solution. Such supersaturation must be removed to prevent calcium carbonate deposition in the treating equipment as well as the equipment of the process for which the water is clarified.

The optionally carbonated effluent of the softener is passed to the stabilizing unit with the calcium carbonate largely in supersaturated solution and its removal is achieved essentially by crystallization—facilitated by the incorporation of precipitated calcium carbonate in the form of fine particles into the stabilizing unit. The pH at this stabilization stage is preferably about 9.4 and suitably is in the range of 9.0 to 10.2. Carbonation of the softener effluent in the same equipment with the stabilization step is desirable as it eliminates a piece of apparatus and, additionally, the formation of larger carbonate particles is facilitated, a factor which enhances the precipitation of the calcium carbonate.

Recarbonation of the effluent of the stabilizing unit results in the conversion of remaining magnesium and calcium components to soluble bicarbonates. Such water is preferably, but not necessarily, filtered and passed to the using system.

Makeup water to compensate for that lost in processing materials may be added to the system at various positions. The nature of the makeup water is, of course, a factor but commonly the water is added to the preliminary reaction unit or the primary softener (first clarifier) so that the water is treated as it is added. The water usually may also be added to the solids contact stabilization unit. Depending upon process losses, a completely closed system may be maintained for long periods of time. For example, if there are only small losses or if care is taken to avoid or minimize losses by inhibiting evaporation, for example, the completely closed system is attained.

In some instances magnesium ions will be present in the makeup water and will reduce the magnesium component cost; however, I have found that it is usually necessary with naturally occurring water to provide additional magnesium in highly reactive form, particularly when magnesium content of the natural water is low or the makeup water is minimal.

The temperature conditions throughout the system are pertinent factors as to reaction rate but will depend in considerable measure upon the nature of the system in which the clarified water is to be employed. The basic procedure operates over a wide temperature range, however. Magnesium hydroxide floc, well hydrated, forms very readily at the required pH range at about 90 to 100° F. Many operations are carried out a such temperatures and the effluent from a creped wadding machine, for example, is frequently in this range.

It is to be noted that the process thus broadly outlined does not of itself increase the dissolved solids of the water undergoing treatment. The water can therefore be reused to an extent that is determined only by the water using process involved. If dissolved solids are introduced by the water using process, they may build up and limit water reuse unless bleed-off is provided.

A primary object of the present invention, accordingly, is the provision of an economical water reclamation process in which magnesium hydroxide is employed as a primary coagulant for suspended matter and is itself formed in situ from soluble magnesium carbonate, magnesium bicarbonate and mixtures thereof, the capacity of the magnesium hydroxide for flocculation being suitably supplemented by the action of a coagulant aid as necessary to provide desirable settling characteristics of the floc.

An important object of the invention is the provision of a water clarification treatment which is operable on a continuous basis, employs normally essentially gelatinous and voluminous magnesium hydroxide precipitate as a primary flocculent and which treatment avoids a net increase in dissolved soluble salts to the recirculating waters while achieving a high percent of water reclamation.

A particular object of the invention is the provision of a water treatment process which employs a finely divided essentially unhydrated magnesium oxide as a reactive constituent, the magnesium oxide preferably having an average particle size of about one micron or less in the largest dimension and with no significant quantity of the magnesium oxide exceeding about one micron.

Yet another object of the invention is the provision of a process in which magnesium oxide is continuously ground to a finely divided form and fed continuously to a water treatment system in which the water undergoing treatment has a bicarbonate hardness.

The invention will be more readily understood by reference to the following detailed description and accompanying drawings wherein.

Figure 1:
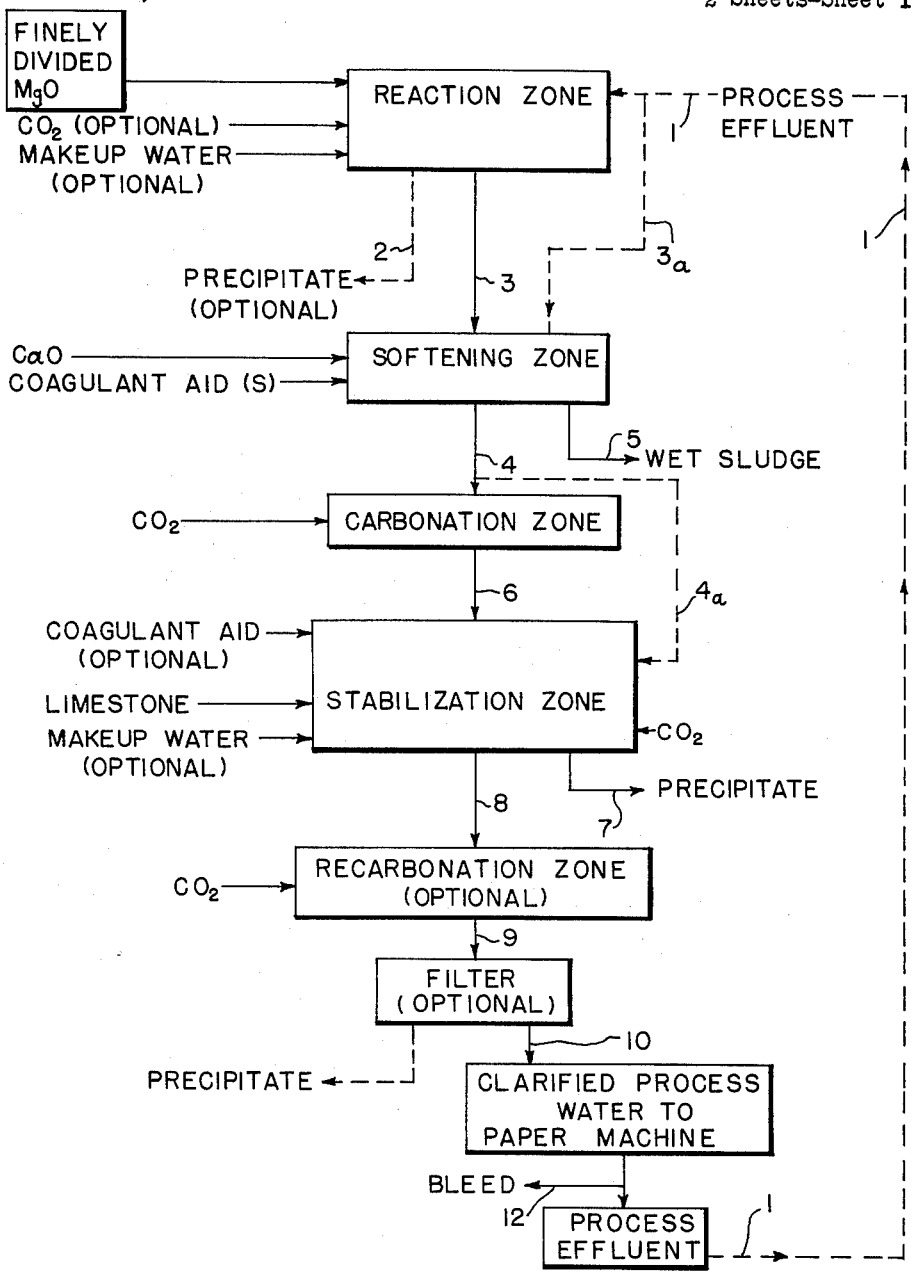
FIG. 1 is a flow chart illustrating the steps in a preferred embodiment of the process of the invention with optional steps designated and as applied to papermaking water reclamation.

While the procedure of invention is applicable to the treatment of many waters and particularly industrial waters, the process will be particularly described in connection with waters of a paper mill system. While the procedure may be batch, preferably the fluid flow is continuous throughout the procedure.

In the drawing the numeral 1 designates a flow path for effluent from a paper mill. Such effluent may commonly contain fiber particles in suspension together with dissolved calcium bicarbonate, magnesium carbonate and bicarbonate as well as surfactants such as the phosphates, for example, sodium hexametaphosphate. Additionally, the original water supply may contain varying amounts of impurities such as organic matter from decaying vegetation, inorganic dissolved components such as chlorides, sulfates, carbonates of calcium, magnesium and sodium as well as oxides of iron, aluminum and silica, and also dissolved gases; some of such constituents may be included in the effluent and may not be detrimental to the particular process. Generally, however, salts of iron are eliminated to avoid paper discoloration and the organics induce slime formation and must be precluded. By the procedure described hereinafter, aluminum oxide, silica if present, and carbonates are removed as well as the iron and organic components. Chlorides and sulfates may be limited if such is necessary to the process either by use of de-ionization equipment or by bleed-off from the process effluent while still recirculating at least 70% of the water.

Effluent flow path 1 of the process communicates with a reaction zone to which magnesium oxide is supplied on a continuous basis as described hereinafter. Carbon dioxide may also be supplied to this zone as required to form carbonic acid for reaction with the magnesium oxide. Any device which permits of addition and thorough mixing of the constituents and provides for sludge and effluent withdrawal is suitable for the purpose of this mixing zone. The magnesium oxide is provided finely divided in an aqueous slurry to facilitate its solution and reaction with carbonic acid and calcium and magnesium bicarbonates present. The particle size of the magnesium oxide should, as already noted, preferably be less than one micron in the greatest dimension for optimum reactivity; the preferred mode of providing the magnesium oxide in substantially unhydrated form and having an average particle size of about one micron and less will be detailed hereinafter. The addition of carbon dioxide, if required for solution of the necessary amount of magnesium oxide, may be from any convenient source such as boiler stack gases. The bicarbonate may be a constituent of the recycled water and/or the makeup water. The magnesium oxide is added in sufficient quantity to provide for flocculation in the primary softener to an extent necessary to bring down as a sludge the various materials noted hereinbefore; and, if practical and consistent with floc requirements, the oxide is added to produce a pH in the reaction zone approaching 10.2. The pH should not be less than aboue 8.3 to provide a predominance of calcium and magnesium carbonates which require less lime for precipitation in the softener than the bicarbonates. Commonly in the systems under consideration, the amount of bicarbonate alkalinity in the water to be processed will be low and the pH resulting from magnesium oxide addition will be well above 8.3. Makeup water is commonly added to the reaction zone as necessary to provide for system usage or losses. Primary products of this reaction are magnesium carbonate in solution and calcium carbonate as a precipitate or in super-saturated solution. Optionally, this calcium carbonate may be eliminated by settling and withdrawal through path 2 or may be passed with the reacted effluent to the primary softening zone through a path designated at 3. I have found that the latter procedure is beneficial to the softening step as it aids settling of the floc.

The softener is preferably an upflow clarifier although it may be any unit which provides agitation and permits separation of sludge from a primary effluent. The necessary lime and coagulant aid (about 0.1 to 10 p.p.m. if employed) are introduced to the clarifier as indicated, together with makeup water as required, and withdrawal of sludge-free effluent is through flow path 4. The sludge passes out through path 5 to waste or for recovery of the magnesium constituent if such is desired. The coagulant aid influences the zeta potential and is selected as necessary to aid achievement of a zeta potential of 0±5 millivolts in the particular system. In some instances such aid is not required. The coagulant aids commercially available are suitable and include locust bean gum, sodium alginate, synthetic polymers, i.e., Separan, a commercial high molecular weight polyacrylamide and a product of Dow Chemical Company, Midland, Mich.

The magnesium hydroxide is formed in the primary softener from the carbonate in situ in the presence of the high pH (at least 10.2 to and preferably 10.5) induced by the lime addition to the softening zone. This pH may suitably be as high as 11.2. The influent through flow path 3 is suitably about 90° F.; this temperature has no significant limit but at higher temperatures the reaction is faster and, of course, the temperature and pressure conditions should be such that the system is liquid. The makeup water itself constitutes not more than about 25% by weight of the primary softener fluid contents.

Alternatively, the process effluent may initially be directed to the softening zone through path 3a and the soluble magnesium salts specified contained in the makeup water are then supplied to this zone.

The primary softener effluent flow path 4 communicates with a carbonation zone. Carbon dioxide is introduced into the effluent in this zone to eliminate hydroxyl ions and to lower the pH such that the system has a pH of between about 9.0 to 10.2 in the subsequent stabilization zone. Optionally, the effluent may be passed from the softener directly to the stabilization zone through path 4a; in this instance carbon dioxide is fed to the stabilization zone and carbonation precedes the stabilizing action within the zone. The effluent of the carbonation zone, if a separate zone is employed, passes through path 6 to the solids contact stabilization zone. The carbonated product, whether from a separate zone or integral with the stabilization zone, contains some magnesium ions, carbonate ions and, more particularly, calcium carbonate in supersaturated solution. The magnesium ions in this papermaking system will have no deleterious effect on papermaking operations and, accordingly, may be passed through the cycle and will serve to reduce the quantity of magnesium oxide introduced into the reaction zone. Therefore, it is not essential that magnesium components be reduced below that point at which they might precipitate in subsequent operations, that is, other than the precipitation in the primary softener.

The stabilization zone is suitably an upflow clarifier also. The zone is seeded with precipitated calcium carbonate of a particle size preferably in the range of 35 microns to 50 microns. The pH in this zone as noted is about 9.0 to 10.2. Preferably, the pH is maintained at about 9.4 for optimum calcium carbonate precipitation. Particle size of the calcium carbonate precipitated is maintained in desired size range by the inclusion of a coagulant aid to the extent of about 0.1 to 5 p.p.m. Such is not always necessary but is effective to agglomerate particles fractured from the seed paricles. The pH is controlled by prior or in situ addition of carbon dioxide. Under these conditions, much of the magnesium components will remain in solution. The effluent of this stabilization zone should contain not more than about 25 to 35 p.p.m. residual alkalinity. The stabilization unit is preferably selected so that the calcium carbonate precipitating from the upflowing liquid will be hydraulically graded, the coarser material being selectively passed toward the path 7 to waste while the finer material is retained in suspension and is subjected to further growth. Stabilization is suitably accomplished by maintaining about 1 to 10% by weight of the material of the stabilization zone as suspended solids at a rise rate of about 1.5 gallons per ft. squared per minute.

The effluent of the stabilization zone for papermaking purposes is directed through the path indicated at 8 and recarbonated to lower the pH to about 8.3 and below, usually not lower than 6.0; it is then passed through path 9 to a filtration zone such as a diatomite filtration procedure, is so desired. The necessity for recarbonation is dependent upon the specific nature of the process in which the clarified water is employed.

The filtered water containing dissolved calcium components as well as some dissolved magnesium components passes to the paper mill system through path 10 and, after use, is returned for reprocessing through path 1. Where makup water for a system contains salts which tend to build in concentration, bleed-off may be provided at path 12.

Important to the described procedure is the requirement that the lime addition raise the pH to within the range of 10.2 to 11.2 and that the magnesium oxide addition be sufficient to provide coagulation in the primary softening step and to adjust the zeta potential toward the range of 0±5 millivolts. The coagulant aids may be anionic or cationic and, as stated above, are selected to provide the system in the noted zeta potential range. Of further importance is the reduction of the stabilized effluent to a condition that the magnesium and the calcium components are present as the bicarbonates.

Figure 2:
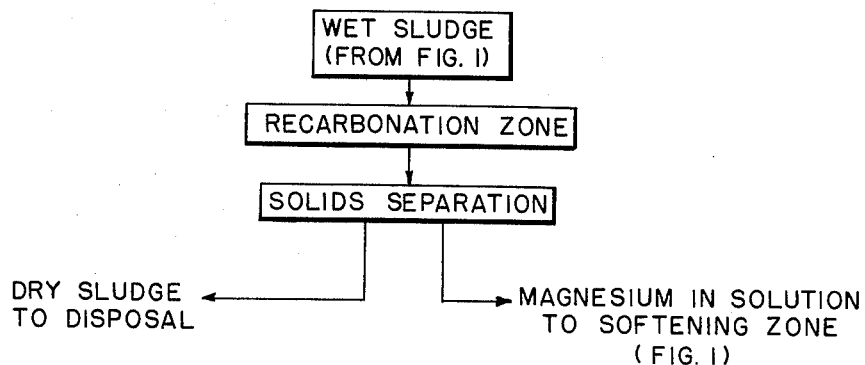
FIG. 2 is a flow chart illustrating a system for magnesium recovery and the attainment of a dry sludge.

To minimize water losses, to provide for economy in the use of magnesium, and, importantly, to achieve a dry sludge which may be subject to ready disposal, the procedure illustrated in FIG. 2 may be followed. Specifically, the sludge and recovered precipitates of the procedure of FIG. 1 are recarbonated and then subjected to a solids separation. The magnesium component in solution as the bicarbonate or carbonate is directed to the softening zone (FIG. 1). The dry sludge is directed to waste. The utilization of such procedure is desirable in those instances where the magnesium cost is high and wet sludge disposal is a particular problem. The solids separation is effected by any suitable means such as filtration or centrifugal action.

Figure 3:
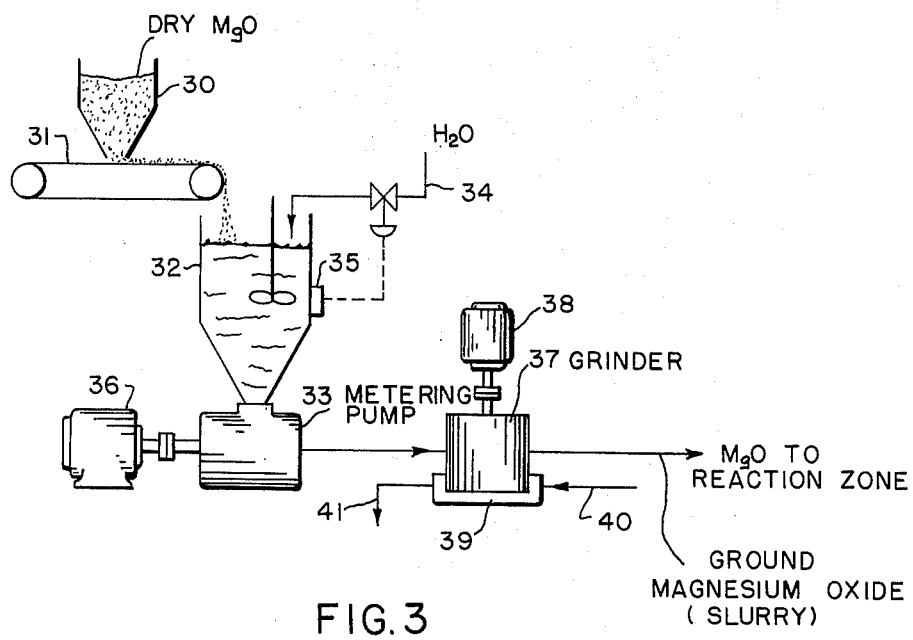
FIG. 3 is an illustration of a system for effecting the grinding of magnesium oxide and the feeding of the same to the water treatment process.

Importantly, I have found that if the precedure illustrated in FIG. 3 is followed, magnesium cost may be minimized. Specifically, I have found that the commercially available magnesium oxide which is of a particle size to pass a 325 mesh screen is essentially unusable in a practical manner in my process—even though such magnesium oxide is considered to be very reactive, having "light burned" in its production. For usage of the commercial material a very large reaction zone is required and the magnesium oxide must commonly be supplied in very considerable excess in order to attain sufficient reaction to produce a desired amount of magnesium hydroxide coagulant; this is for the reason that with large particles—much above one micron in their largest dimension—the oxide does not react completely except over a long period of time—a matter of hours. Thus, either an excess is required and is lost with the sludge of the primary softener or the procedure is materially slowed and involves excess equipment capacity.

In FIG. 3 the magnesium oxide of commerce (material which passes a 325 mesh screen) is fed through a hopper 30 to a metering belt 31 moving in the direction indicated by the arrow. The metering belt feeds magnesium oxide in controlled quantity to a slurry pot 32 which communicates with a liquid metering pump 33, which may be a Moyno pump. Slurry pot 32 is fed through a conduit indicated at 34 with water in controlled quantity—any suitable level control device as indicated at 35 which controls flow into the slurry pot 32 serves the purpose. Pump 33 is driven by a speed controlled motor 36 and the outlet of the pump communicates with a griding device 37 driven by a suitable motor 38.

The grinding device 37 receives the aqueous slurry of commercial grade magnesium oxide, a slurry having not more than about 30% magnesium oxide by weight. I prefer to feed a slurry of about 10 to 22% by weight magnesium oxide.

Certain precautions may be taken to insure of optimum slurry formation and preservation of the magnesium oxide form. The water fed to slurry pot 32 preferably is stabilized, that is, it is free of bicarbonate alkalinity to any significant degree. This avoids calcium carbonate formation in the pump and pipe lines and avoids equipment fouling. Further, the temperature of the water is preferably below 90° F. and must be kept below 90° F. during the grinding and feed of the ground slurry to the reaction zone (indicated at 1 in FIG. 1).

For the purpose of maintaining the magneisum oxide below 90° F. in the grinding of the slurry, a cooling water jacket 39 having an inlet 40 and an outlet 41 may be provided. If the temperature of the magnesium oxide is permitted to rise above about 90° F. before contact with the bicarbonate in the reaction zone 1, then hydroxide will form rapidly and solution as carbonate is inhibited; such does not render the overall system inoperative but materially increases the lime requirement of the primary softner and extends the reaction time; also, the efficiency of operation of a recycling system will be decreased.

The contact time of the magnesium oxide with water must also be limited to avoid hydroxide formation. I have found that a time period of not more than about 10 minutes (utilizing commercial grade magnesium oxide of 325 mesh as the starting material) is permissible—this time period being applicable to: the first presentation of the magnesium oxide to the water to the step of mixing in the reaction zone of the ground material. The actual time in the grinding unit itself is much less—a matter only of seconds; accordingly, the procedure, from grinding to reaction, is essentially necessarily continuous.

The grinding unit may be a colloid mill of conventional type; I have also found that a grinding unit such as is described in United States Patent 2,855,156 is very useful for the purpose.

In specific application: a commercial grade magnesium oxide considered of high reactivity and marketed under the designation "Grade 2663" by Food Machinery and Chemical Corporation, New York, N.Y., was tested as purchased and, after grinding as described above. About 97.2 milligrams of the purchased material having a fineness such that it passed a 325 mesh screen was added as a 20% by weight aqueous slurry to a quantity of water having a bicarbonate concentration of 243 milligrams per liter. About 50% of the magnesium oxide reacted with the water and was dissolved within 15 minutes; the remaining 50% by weight was not dissolved.

In contrast, the same material, when passed as a 20% aqueous slurry once through a grinding device to reduce the particle size as described hereinbefore, and with all other conditions equal, dissolved completely in a 15-minute period. The aqueous slurry was fed immediately from the grinding unit to the water. However, the same ground and aqueous slurry material becomes ineffective for my purpose if the slurry at this 20% concentration is permitted to stand for a period of about 5 minutes before addition to the water undergoing treatment.

While I have emphasized the grinding of the magnesium oxide in slurry form, I contemplate also that the magnesium oxide may be ground dry. However, in such instance equipment must be provided to protect the oxide from moist atmospheres; if the hydroxide is permitted to form during the dry or the wet grinding process, the reactivity is seriously impaired as the hydroxide formation reduces the available surface contact area. Also, hydration occurs much more readily in the finely divided state, that is, at an average particle size of one micron and less.

It may further be noted that the effect of magnesium oxide solution by the bicarbonate water is to materially raise the pH. In the above specific comparison the pH of the initial water was about 7.6. The addition of the ground magnesium oxide raised this pH to about 9.2 within about one minute and to 10.26 at the end of the solution period; in contrast, the commercial product raised the pH to only about 8.9 after 20 minutes of contact.

It will be appreciated that, where the magnesium hydroxide demand of a system is such that all of the bicarbonate (hardness) content will be consumed by reaction with the magnesium oxide, my system has optimum efficiency. For then the oxide serves the dual purpose to the utmost degree of acting as a water softening and a coagulation agent. Such condition is essentially a stoichiometric reaction condition. When the water contains more bicarbonate hardness than is required for cooperation with the oxide, some lime will be consumed by the bicarbonates.

It is further to be noted that, where makeup water contains sufficient bicarbonate hardness, all of the oxide may be added to the makeup, thus simplifying equipment since the reaction zone may then be relatively small. The magnesium oxide may, of course, always be added to react stoichiometrically with the total bicarbonate of the waters being fed to the clarifier as long as sufficient bicarbonate hardness is present, but such may be undesirable in some instances as merely providing an unnecessary excess of the magnesium hydroxide at some increased cost.

I have found also that the utility of my system is most apparent when the water to be treated
 (a) has a high suspended solids content, that is, between about 100 and 1100 parts per million;
 (b) has a considerable anionic charge as the magnesium component itself functions to reduce such charge, the magnesium hydroxide being cationic, thereby aiding coagulation;
 (c) has both a considerable bicarbonate hardness content and a considerable requirement for coagulant formation as the lime savings by magnesium carbonate formation from the magnesium oxide is then greater and in proportion to the quantity of magnesium oxide employed.

I am aware that the water treatment art has previously considered dissolved naturally occurring magnesium components as a source of magnesium hydroxide in coagulant systems. I am also aware that the art has suggested the use of magnesium oxide together with coagulant materials such as iron salts and aluminum salts (alum for example) in coagulation procedures particularly where silica removal is required; these latter systems are largely dependent upon the formation of the hydroxides of rion and aluminum and possibly magnesium aluminates, for example, for the coagualnt purposes. The iron and aluminum coagulant materials are not suitable for my purpose, and I have found that, at the higher pH values are quite ineffective—particularly at high solids content of the water.

It will be understood that this invention is susceptible to modification in order to adapt to different usages and conditions and, accordingly, it is desired to comprehend such modifications within the invention as may fall within the scope of the appended claims.

What is claimed is:

1. In a lime treatment process for water, which water contains bicarbonate hardness, the improvement which comprises the step of introducing to the water, prior to the treatment with lime, substantially unhydrated magnesium oxide of a particle size of between about 0.1 to 1 micron with no significant quantity of the magnesium oxide exceeding about one micron so that the magnesium oxide reacts directly and essentially completely with bicarbonate hardness (a) to provide the magnesium component in solution essentially as magnesium carbonate and (b) to decrease the bicarbonate hardness, and adding to the water of decreased bicarbonate hardness containing the soluble magnesium component lime at least in sufficient amount to precipitate the magnesium component as a coagulant, and whereby the lime requirement for softening of the water is reduced.

2. The process as claimed in claim 1 and in which the water containing the bicarbontae hardness is recirculated water of a water using process.

3. The process as claimed in claim 1 and in which the water containing the bicarbonate hardness is makeup water for a recirculation water process.

4. In a lime treatment process for water softening and coagulation and removal of suspended material from water, which water also contains bicarbonate hardness, the improvement which comprises the step of reducing magnesium oxide, while preventing any substantial hydration of the magnesium oxide, to a particle size of between about 0.1 to 1 micron with no significant quantity of the magnesium oxide exceeding about one micron so that the magnesium oxide will react directly and completely with bicarbonate hardness of water, introducing to the water to be treated the substantially unhydrated magnesium oxide to substantially completely react the magnesium oxide directly with bicarbonate hardness to (a) provide the magnesium component in solution essentially as magnesium carbonate and (b) to decrease the bicarbonate hardness of the water, and thereafter adding to the water of decreased hardness containing the soluble magnesium component lime at least in sufficient amount to precipitate the magnesium component as a coagulant, and whereby the lime requirement for softening of the water is reduced.

5. In a lime treatment process for the coagulation and removal of suspended material from water, which water also contains bicarbonate hardness, the improvement which comprises the step of grinding magnesium oxide to a particle size of between about 0.1 to 1 micron with no significant quantity of the magnesium oxide exceeding about one micron in an aqueous slurry having a magnesium oxide content of up to about 30% by weight while preventing any substantial hydration of the magnesium oxide by maintaining the temperature of the slurry below about 90° F. during the grinding, substantially immediately passing the aqueous slurry containing the ground magnesium oxide into the water containing the bicarbonate hardness to react the magnesium oxide substantially completely and directly with bicarbonate hardness to thereby reduce the bicarbonate hardness and provide the magnesium component in solution essentially as magnesium carbonate, and thereafter adding to the water of decreased hardness containing the soluble magnesium component lime at least in sufficient amount to precipitate the magnesium component as a coagulant, and whereby the lime requirement for softening of the water is reduced.

6. The process as claimed in claim 5 and in which the magnesium oxide in the aqueous slurry form is ground at a concentration of magnesium oxide of about 10 to 22 percent by weight.

7. In the lime treatment of water containing bicarbonate hardness and objectionable suspended matter to soften and reclaim a proportion of the water in excess of 70% on a continuous basis, the process which comprises:
 (a) feeding the water to be reclaimed to a reaction zone and reacting the bicarbonate hardness with substantially unhydrated magnesium oxide of an average particle size of between about 0.1 and 1 micron to react the magnesium oxide directly and essentially completely to magnesium carbonate and to reduce the bicarbonate hardness;
 (b) admixing with the water containing the magnesium carbonate sufficient lime to provide a pH in the range of about 10.2 to 11.2 and to provide in situ formation of a gelatinous, voluminous flocculent precipitate of magnesium hydroxide;
 (c) coagulating by agitating the water to cause the flocculent precipitate to encompass suspended matter and to form a sludge therewith;
 (d) passing the sludge resulting from the coagulation along a path by which the sludge is eliminated from the effluent water;
 (e) passing the effluent water along a main flow path and carbonating the effluent water to reduce the pH to between about 9.0 to 10.2 and to convert hydroxides in the effluent to carbonates;
 (f) stabilizing the carbonated effluent by contact with finely divided calcium carbonate particles whereby any calcium carbonate in supersaturated solution is precipitated and the water is clarified;
 (g) circulating the water so clarified to a water using process from which at least 70% of the water is recoverable as an effluent; and
 (h) continuously recirculating the effluent from the using process through the said steps from the reaction zone and back to the using process.

8. In the reclamation treatment of process water which contains bicarbonate hardness and objectionable suspended matter including anionic charged particles, the method which comprises:
(a) feeding the water to be reclaimed together with magnesium oxide in the form of fine powder having an average particle size in the range of 0.1 to 1 micron to a reaction zone to achieve a pH of at least 8.3 and up to 10.2 to form calcium carbonate and to provide the magnesium component essentially as magnesium carbonate in solution;
(b) flowing effluent of step (a) to a softening zone and admixing the said effluent with a coagulant aid and sufficient lime to provide a pH in the range of 10.2 to 11.2 and to provide in situ formation of a gelationous, voluminous, flocculent precipitate of magnesium hydroxide and a zeta potential of 0±5 millivolts;
(c) coagulating by agitating the water to cause the flocculent precipitate to encompass suspended matter and form a sludge therewith;
(d) passing the sludge resulting from the coagulation along a path by which the sludge is eliminated from the effluent water;
(e) passing the effluent water along a main flow path and carbonating the effluent water to reduce the pH and to convert hydroxides in the effluent to carbonates;
(f) stabilizing the carbonated effluent at a pH of 9.0 to 10.2 by contact with finely divided calcium carbonate particles whereby any calcium carbonate in supersaturated solution is precipitated and the water is clarified;
(g) circulating the water so clarified to a water using process from which at least 70% of the water is recoverable as an effluent; and
(h) continuously recirculating the effluent from the using process through the said steps and back to the using process.

9. In the lime treatment of water containing bicarbonate hardness and objectionable suspended matter to soften and reclaim a proportion of the water in excess of 70% on a continuous basis, the process which comprises:
(a) feeding water containing bicarbonate hardness to a reaction zone and reacting the bicarbonate hardness with substantially unhydrated magnesium oxide of an average particle size of between about 0.1 and 1 micron to react the magnesium oxide directly and essentially completely to magnesium carbonate and to reduce the bicarbonate hardness;
(b) admixing with the water containing the magnesium carbonate, and including water to be reclaimed, sufficient lime to provide a pH in the range of about 10.2 to 11.2 and to provide in situ formation of a gelatinous, voluminous flocculent precipitate of magnesium hydroxide;
(c) coagulating by agitating the water to cause the flocculent precipitate to encompass suspended matter and to form a sludge therewith;
(d) passing the sludge resulting from the coagulation along a path by which the sludge is eliminated from the effluent water;
(e) passing the effluent water along a main flow path and carbonating the effluent water to reduce the pH to between about 9.0 to about 10.2 and to convert hydroxides in the effluent to carbonates;
(f) stabilizing the carbonated effluent by contact with finely divided calcium carbonate particles whereby any calcium carbonate in supersaturated solution is precipitated and the water is clarified;
(g) circulating the water so clarified to a water using process from which at least 70% of the water is recoverable as an effluent; and
(h) continuously recirculating the effluent from the using process through the said steps from the reaction zone and back to the using process.

10. A process according to claim 9 and in which the water feed to the reaction zone in step (a) is makeup water.

References Cited by the Examiner

UNITED STATES PATENTS 2,307,466   1/1943   Noll et al. _____ 210—52

FOREIGN PATENTS 527,153   10/1940   Great Britain.

OTHER REFERENCES

Nordell, Water Treatment for Industrial and Other Uses, second edition, 1961, Reinhold, New York, pp. 503–506, 511 and 512.

MORRIS O. WOLK, *Primary Examiner.*

MICHAEL E. ROGERS, *Examiner.*